United States Patent [19]

McNab et al.

[11] 4,277,708

[45] Jul. 7, 1981

[54] ENVIRONMENT AND BRUSHES FOR HIGH-CURRENT ROTATING ELECTRICAL MACHINERY

[75] Inventors: Ian R. McNab, Murrysville; Philip Reichner, Plum Borough, both of Pa.

[73] Assignee: Westinghouse Electric Corp., Pittsburgh, Pa.

[21] Appl. No.: 51,927

[22] Filed: Jun. 25, 1979

[51] Int. Cl.[3] .......... H02K 13/00

[52] U.S. Cl. .......... 310/228; 310/248; 310/252

[58] Field of Search .......... 310/248–252, 310/227, 228, 220, 221, 238, 246, 55

[56] References Cited

U.S. PATENT DOCUMENTS

| | | | |
|---|---|---|---|
| 276,233 | 4/1883 | Edison | 310/252 X |
| 345,336 | 7/1886 | Thompson | 310/248 X |
| 2,269,614 | 1/1942 | Von Soden | 310/228 |
| 3,382,387 | 5/1968 | Marshall | 310/248 |

OTHER PUBLICATIONS

*Electrical-Power Brushes for Dry Inert-Gas Atmospheres*, by Johnson & McKinney, Proceedings of the Holm Seminar on Electric Contact Phenomena, Chicago, Ill., USA, Nov. 2-6, 1970, pp. 155-162.

*Primary Examiner*—Mark O. Budd
*Attorney, Agent, or Firm*—D. P. Cillo

[57] ABSTRACT

A high-current electrical machine, comprises a stationary and a moving member and at least one current collector brush disposed between the members and in frictional contact with one member; where the brush comprises a plurality of flexurally independent, metal fibers, and where a non-oxidizing gaseous medium containing water vapor, contacts the interface of frictional contact of the brush to provide a lubricating effect.

9 Claims, 3 Drawing Figures

ENVIRONMENT AND BRUSHES FOR HIGH-CURRENT ROTATING ELECTRICAL MACHINERY

GOVERNMENT CONTRACT

The Government has rights in this invention pursuant to Contract No. N00014-76-C-0683 awarded by the Dept. of the Navy.

BACKGROUND OF THE INVENTION

It is necessary in many electrical machines to provide an electrically conducting path between two parts which are moving relative to one another. In dynamo-electric machines, for example, it is common to use a brush of electrically conducting material sliding on the surface of a slip-ring or commutator, to provide a current path between the rotor and an external connection. A principal requirement of such a brush is that it be able to carry a high current per unit area of interface between the brush and the surface which it contacts, and it should have high wear resistance, and low friction.

Carbon, graphite, and carbon-metal blocks have been used for brushes in the past. These blocks were limited to current densities of about 100 Amp./in.$^2$, for satisfactory operation in air. With such brushes, however, typically only about 1/10,000 of the brush face surface area is available as an actual interface contact for current transfer. This is due to oxide films present in the area of interface contact, irregular brush and slip-ring surface topography, and the accumulation of surface debris. High load forces, to improve brush contact, have resulted in high brush friction and wear.

McNab, in U.S. Pat. No. 3,668,451, and Hillig, in U.S. Pat. No. 3,886,386, attempted to remedy contact problems by using multi-element brushes of encased, metal coated, tightly packed aluminum oxide or boron nitride non-conducting fibers, or elongated, plated or unplated, conducting carbon fibers. These brushes provided good contact surface area along with high strength and flexibility. They could be used for current densities on the order of about 1,000 Amp./in.$^2$, at continuous sliding speeds of up to about 18,000 ft./min.

Efforts to eliminate high wear and voltage drop due to oxide films, have included the use of hydrogen gas as a cooling medium, in conjunction with the introduction of a small quantity of mercury vapor into the non-oxidizing cooling gas, as taught by Baker et al, in U.S. Pat. No. 1,922,191. More recently, air, conditioned with alcohols, ethers, esters or ketones, has been used to cool and lubricate brushes for d.c. generators or motors, used in high altitude aircraft, and operating in dry rarefied air, as taught by Fisher et al, in U.S. Pat. No. 2,662,195, and by Savage, in U.S. Pat. No. 2,703,372.

Within the last fifteen years, a large amount of interest has been shown in the development of homopolar machines for ship propulsion or for pulse duty fusion power applications. Generally, these are machines in which the magnetic field and the current flowing in the active conductors maintain the same direction with respect to those conductors while the machine is in steady operation.

For high efficiency and acceptable machine size, the current collection systems for these high-current rotating machines must operate under very severe conditions. The current density levels at the brush interface contact may be as high as 5,000 Amp./in.$^2$, at continuous sliding speeds of up to 20,000 ft./min. Pulsed duty machinery may call for 25,000 Amp./in.$^2$ at 65,000 ft./min., at times, for hundreds of milliseconds.

British Pat. No. 1,256,757 attempted to solve current collection problems in homopolar dynamo-electric machines, by using a very sophisticated and costly liquid metal current collection system of the sodium-potassium type. While these metal type current collection systems provide high electrical conductivity and intimacy of contact, they also pose serious machine design, turbulence, toxicity and material compatibility problems.

In order for homopolar and other types of high-current electrical machines to be economically attractive, new types of current collection and environment means must be developed that are simple and inexpensive, and which keep electrical and frictional current collection losses at a minimum.

SUMMARY OF THE INVENTION

The above described problems are solved and the above need is met, by providing a high-current electrical machine, having a stationary and a moving member and at least one current collector brush disposed between the members and in frictional contact with one member; where wear is minimized at the area of frictional contact by providing a brush, comprising a plurality of flexurally independent, electrically conducting metal fibers of circular or other cross section, preferably of copper, each fiber having a maximum thickness or diameter of 0.04 inch and operating at an appropriate fiber contact lead, and shielding the area of frictional contact from air and providing to the contact area a non-oxidizing gaseous medium, preferably carbon dioxide, containing water vapor to provide a lubricating effect. The vapor pressure of the water in the gas must be effective to provide sufficient vapor at the brush surface to produce the desired lubricating effect in the form of a substantially continuous film at the area of brush friction.

BRIEF DESCRIPTION OF THE DRAWINGS

For a better description of the invention, reference may be made to the preferred embodiments exemplary of the invention, shown in the accompanying drawings, in which.

DESCRIPTION OF THE PREFERRED EMBODIMENTS

Figure 1:
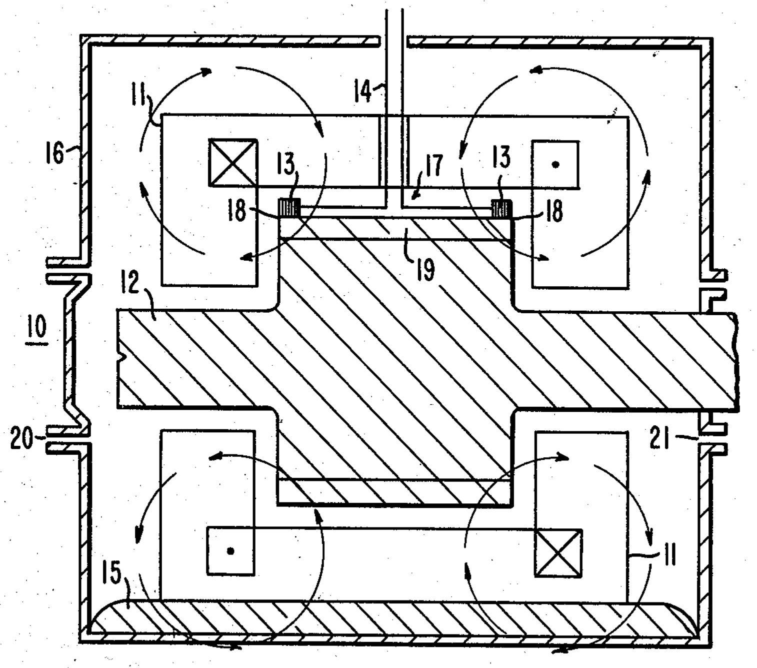
FIG. 1 is a schematic illustration of an enclosed, drum-shaped, homopolar dynamo-electric machine.

Referring to FIG. 1 of the drawings, an enclosed, drum-shaped, high-current, homopolar dynamo-electric rotating machine 10 is shown. The theory of homopolar machines dates back to 1831 when Michael Faraday exhibited the first homopolar generator at the Royal Soceity. Faraday demonstrated that a voltage could be generated by rotating a disk between the poles of a horseshoe magnet and collecting current at the inside and outside diameters of the disk.

A characteristic of a homopolar machine is that the armature winding is composed of two segments; one rotating and one stationary. This configuration limits the number of turns that can be used in the armature.

Therefore, since the armature winding has a small number of turns, the homopolar machine has inherently low voltage and high current. Development of these machines has been limited over the years since 1831, because the large currents must be transmitted through sliding contacts between the rotating and stationary members.

Homopolar machines can be grouped in two categories; the disk type and the drum type. For the disk type, an axial magnetic field produced by a solenoidal d.c. magnet is cut by a disk-shaped rotor, which is moving in a plane perpendicular to the field. As the disk is rotated a voltage is developed in the radial direction due to an increasing linkage of the magnetic field. By placing brushes on the outside diameter of the disk and at the center of the disk, electrical power can be extracted equivalent to the input mechanical power minus the mechanical and electrical losses in the system.

For the drum type homopolar machine shown in FIG. 1, a radial magnetic field, produced by solenoidal d.c. magnet coils in the stator 11, and shown as dotted arrows, is cut by a drum-shaped rotor 12. As the drum rotates, a voltage is generated. If brushes 13 are placed on either end of the drum-shaped rotor, electrical power can be extracted from this system via leads 14. A base 15 and enclosure 16 are also shown, along with gap 17, in which, when the rotor 12 rotates, the rotor conducting path moves transversely to the magnetic lines of force in the gap. The brushes 13 are disposed between the moving rotor 12 and a stationary member supporting the brush, not shown in the drawing.

The solid drum homopolar machine has the same mechanical and electrical limitations as the solid disk homopolar machine, where high peripheral velocities limit the design of the sliding electrical brush contacts 13. Voltage of these machines can be increased, for the disk type, by segmenting the disks and connecting the segments in series, or by connecting several disks in series. For the drum type homopolar machine, voltage can be increased by segmenting the drums and connecting the segments in series, or by connecting several drums in series. The term "homopolar machine" is meant to include all of these various configurations.

Applicants' invention relates to transferring current in dynamo-electric machines, and involves the use of a multi-element brush, composed of a large number of flexurally, i.e. mechanically independent fibers operating at a suitable contact lead, in conjunction with a humidity controlled non-oxidizing atmosphere. The flexurally independent fibers are each flexible, and have freedom of independent motion. They are spread apart at their contact end and are not pressed together as by twisting or being encased in a sheath. The brushes 13 have a pressure or load applied to them so that they are in contact with the rotor interface at the surface of the slip ring 18. The brushes make a suitable mechanical and electrical contact to an electrical circuit through attached leads 14. The drum rotor 12, shown in FIG. 1, if it is made of steel, can have an aluminum, copper, or other highly electrically conductive rim 19 joined to its outside surface.

The brush of this invention comprises a plurality of elements, generally from 5 to 10,000,000. While single brushes 13 are shown on the stationary part of the machine, the brushes could be of a circular configuration around a rotating member, such as around the periphery of the rotor, and could comprise hundreds of millions of elements. Suitable fibers are selected from metals such as silver, rhodium, ruthenium, gold, cobalt, aluminum, molybdenum, copper, and alloys thereof. Copper is preferred. The fibers, if circular, will have a thickness or diameter of between $4\times10^{-4}$ inch to to $4\times10^{-2}$ inch (10 to 1,000 microns). Here, thickness is meant to include diameter and will be used to refer to both circular and rectangular configurations. The fibers will have a free length of, preferably, between about 0.08 inch to about 1.0 inch (2 to 25 millimeters).

Fiber thicknesses less than $4\times10^{-4}$ inch provide a fragile brush, and require a very short length or a reduced load, which may allow poor brush-slip ring contact due to rotor eccentricities and due to lubricating film buildup between the brush and the slip ring. Fiber thicknesses over $4\times10^{-2}$ inch provide a stiff brush, which may require extremely long elements, and require an increased load for good brush-slip ring contact. This can cause fiber breakthrough of the lubricating film, resulting in excessive heat buildup and wear. The slip ring 18 can be made from the metals or aloys listed above for the brushes, preferably copper or silver plated copper. The mechanical, fiber contact load on the slip ring or other moving surface is critical, and must be between $1\times10^{-6}$ lb./fiber to $1\times10^{-2}$ lb./fiber. Values over $1\times10^{-2}$ lb./fiber can cause breakthrough of the lubricating film. Values under $1\times10^{-6}$ lb./fiber can cause reduction in electrical conduction.

In combination with the multi-element brush, a controlled operating environment is maintained within the enclosure, as at gap 17. To ensure operation without insulating film formation, excessive heat buildup and brush wear, a high thermal conductivity, oxygen-free humidified atmosphere, of a gas selected from carbon dioxide, argon, helium, nitrogen, or hydrogen alone or in mixture, must be used.

The humidified non-oxidizing gas can be completely enclosed within the machine, or it can be continuously passed through the machine, such as by entry at inlets 20 and exit at outlets 21. The humidified gas must contact and enter the interface between the brush and the rotating member, to provide a lubricating effect. The water present in the gas must be an amount effective to permit adsorption of an extremely thin water vapor film on the surface of the brush and slip ring, providing lubricating properties between the brush and the slip ring. This $H_2O$ film is believed to be on the order of 1 to 10 molecules thick and preferably, substantially continuous. Generally, the partial pressure of the water vapor in the gas will be greater than ice point saturation, between about 0.09 psi. and about 0.36 psi. room temperature saturation. Below a partial pressure of about 0.09 psi. ice point saturation, the lubricating film formed can be discontinuous and of little lubricating effect. Over about 0.36 psi. room temperature saturation, the film could tend to impede current transfer at the brush-slip ring interface, and condensation can occur in unheated regions of the machine.

The use of brush fibers having good thermal conductivity and formation of the low friction contact lubricating film at the brush face typically provides an average brush interface contact temperature with the slip ring of between about 75° C. to 200° C.

The exclusion of air prevents gross oxidation, and the associated high rate of abrasive wear or high contact film resistivity, depending upon the mechanical stress/-strength relationship of the surface film. The introduction of water vapor is believed to produce a controlled interface film on the rotating slip ring and at the brush face where it contacts the rotating member, due to physisorption or chemisorption, which is necessary to successful operation.

Figure 3:
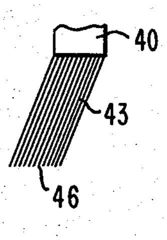
FIG. 3 is a detailed illustration of the brush construction.

Subdivision of the brush into many substantially parallel and separated mechanically and flexurally independent metallic elements, as shown in FIG. 3 of the drawings, permits a corresponding dispersion of the mechanical force over the sliding interface. Flexibility and freedom of independent motion of each fiber is required to assure equal sharing of the load and ability to follow irregularities in the slip ring surface. Each element can then be considered as a separate contact with a greatly reduced force. In combination with the lubricating film described above, this permits the metallic surface to slide in sufficiently close proximity to permit electron conduction through the lubricating interface film, but essentially prevents intimate metallic contact and local welding.

Although the invention has been described hereinabove for use in a homopolar type electric machine, it is to be understood that the invention can be used advantageously in any type of rotating or linear electric machine or device, such as large motors requiring an electrically conducting path between two parts, where one or both parts are moving relative to one another. Thus the brush may be attached to either a stationary or a moving member.

EXAMPLE 1

Figure 2:
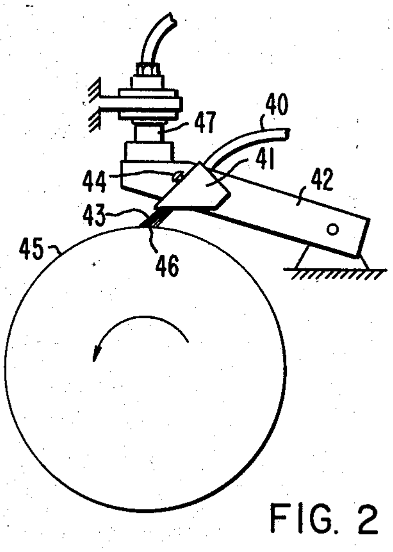
FIG. 2 is a schematic illustration of the brush testing apparatus used in the Examples.

A single-bundle fiber brush was tested in a simple gravity loaded current collector system, shown in FIG. 2. The system was enclosed in a sealed chamber to permit control of the atmosphere. The brush was a hand spread copper cable and consisted of 168 separate copper elements, each $5\times10^{-3}$ inch in diameter (127 microns). The extension of the elements of the brush from the holder was approximately 0.31 inch (8 millimeters). Each copper fiber element was mechanically, and flexurally, independent from the other fiber elements.

The cable 40, shown in FIGS. 2 and 3 of the drawings, fitted into a copper holder 41, attached to a loading arm 42. The spread brush end 43 protruded from the front of the holder and comprised independent, substantially parallel fibers. A set-screw 44 locked the brush in position for testing, but permitted periodic or continuous feeding through the holder, to renew the brush and accommodate and replace brush wear, by advancing the cable 40, which was also used as the current shunt. The shunt was positioned to minimize its effect on the brush contact force which was measured after electrical connections were completed. The sealed chamber is not shown.

The brush 43 was set at about a 45° angle relative to an 82.6 millimeter diameter slip ring surface 45. The slip rings used were either solid copper, or silver plated copper. The brush face was formed to the curvature of the slip ring, to provide good contact at the interface 46 of the brush and the slip ring, using 240 grit aluminum oxide cloth, which was wrapped, abrasive side out, around the rotating slip ring periphery. Brush wear was measured by a wear sensor, shown as 47. After the proper curvature was formed on the brush face and the grit cloth removed, contact voltage drops were measured between the slip ring surface and the brush holder.

Most of the contact drop tests were performed with humidified carbon dioxide or argon as the non-oxidizing gaseous medium. A continuous flow of the humidified, non-oxidizing gas was passed through the chamber, in which the pressure was essentially atmospheric pressure, to provide a continuous lubricating film at the brush-slip ring interface. The partial pressure of the water vapor was 0.36 psi. (room temperature saturation). The slip ring speed was maintained at mostly 2,380 ft./min. (2,800 rpm). The brush was positive relative to the slip ring. Current densities were calculated in terms of the cross-section of each fiber. The results are shown below in Table 1 mostly for two hour running periods:

TABLE 1

| Current Density (Amp/in.$^2$) | Sliding Speed (ft./min.) | No. Brush Cu. Fibers | Slip Ring Surface | Vapor Laden Gas | Voltage Drop (mv) | Total Contact Force (lb) |
|---|---|---|---|---|---|---|
| 8,000 | 2,380 | 168 | Cu. | $CO_2$ | 48 | 0.038 |
| 8,000 | 2,380 | 168 | Ag. | $CO_2$ | 14 | 0.040 |
| 8,000 | 2,380 | 168 | Ag. | Ar | 14 | 0.040 |
| 8,000 | 2,980 | 168 | Ag. | $CO_2$ | 9 | 0.063 |
| 65,000 | 2,380 | 168 | Ag. | $CO_2$ | 125 | 0.049 |

The fiber contact load was usually about $2.4\times10^{-4}$ lb./fiber. This data, from a simulated high-current, rotating machine environment, shows very low voltage losses from the copper slip ring, and outstanding results from the silver plated slip ring, using either humidified carbon dioxide or argon gas. For comparison with the fiber brush at 8,000 Amp./in.$^2$, a conventional metal-graphite brush, containing 96% copper, carrying the same total current at 100 Amp./in.$^2$ would be 0.5 inch square and would have a voltage drop of approximately 100 mv.

In the 8,000 Amp./in.$^2$ cases, the average brush interface contact temperature was well below 200° C., showing that a lubricating water vapor film formed and that the use of a plurality of independent, good thermally conductive fibers dissipated heat buildup. After each test the brush face was examined, and in each case showed minimal wear with no oxidation or fusing of the fibers evident. In the 65,000 Amp./in.$^2$ case, after about 2 hours running time above 60,000 Amp./in.$^2$, the interface temperature exceeded 300° C. and some deformation of the brush was noted. However, the test demonstrated that operation of the brushes and slip ring can be achieved for short periods even at extremely high currents.

When the partial pressure of the water vapor in carbon dioxide was reduced to 0.09 psi. (ice point saturation) a slight roughening of the brush track occurred on the slip ring surface, and the voltage drop measurements started to become inconsistent. Partial pressure reduction below this value would produce increased roughening of the contact surface and increased electrical contact resistance.

Introduction of room air produced very erratic measurement of contact voltage drop, and rapid abrasive wear of the brush and slip ring surface. Thus, the combination of gas used and the amount of water vapor present are important in providing a low friction sliding contact surface still capable of efficient current transfer.

EXAMPLE 2

In this Example, a multiple-bundle fiber brush was tested at a range of current densities and sliding speeds. The test apparatus was somewhat larger but its operation was similar to that of Example 1, and maintained similar fiber contact leads. However, the brush comprised 15 bundles (3 rows of 5 brushes), providing 2,520 hand spread separate copper elements, each $5\times10^{-3}$ inch in diameter and approximately 0.31 inch long. The brush was composed into a rectangular shape to fit a conventional holder. Each fiber element was mechanically and flexurally independent. The ends of the brush cables were soldered to provide two current shunts. The brush face was contoured to the slip ring surface as described in Example 1.

The multiple-bundle brush was set at about a 45° angle relative to a 356 millimeter diameter copper slip ring surface. The results of contact drop tests are shown below mostly for two-hour running periods:

TABLE 2

| Current Density (Amp/in.$^2$) | Sliding Speed (ft./min.) | No. Brush Cu. Elements | Slip Ring Surface | Vapor Laden Gas | Voltage Drop (mv) |
|---|---|---|---|---|---|
| 4,000 | 2,380 | 2,520 | Cu. | $CO_2$ | 35 |
| 8,000 | 2,380 | 2,520 | Cu. | $CO_2$ | 43 |
| 10,000 | 2,380 | 2,520 | Cu. | $CO_2$ | 60 |
| 15,000 | 9,840 | 2,520 | Cu. | $CO_2$ | 80 |

This data, from a simulated high-current, rotating machine environment, using multiple-bundle brushes, as would probably be done commercially, shows low voltage losses from the copper slip rings at both 4,000 Amp/in.$^2$ at 2,380 ft./min. and at 15,000 Amp/in.$^2$ at 9,600 ft./min.

In all cases, the average brush interface contact temperature was well below 200° C., showing that the continuous lubricating film formed and that the use of a plurality of good thermally conductive fibers dissipated heat build up. After each test the brush face was examined and in each case showed minimal wear with no oxidation or fusing of the fibers evident.

The use of silver or the other fiber types mentioned, or the use of the other slip ring surfaces mentioned above would produce similar excellent results, as would the use of the other humidified non-oxidizing atmospheres mentioned herein.

We claim:

1. A high-current electrical machine, comprising a stationary and a moving member and at least one fibrous current collector brush disposed between the members and in frictional contact with one member, the improvement comprising a current collector brush comprising a plurality of flexurally independent, electrically conducting, solid metal fibers where the mechanical fiber load of the brush at the area of frictional contact is between $1\times10^{-6}$ lb./fiber and $1\times10^{-2}$ lb./fiber, and shielding said area of frictional brush contact from air while providing to said area a non-oxidizing gaseous medium containing an amount of water vapor effective to form a lubricating film between the brush and the frictionally contacting member at their interface, to allow current transfer to the brush and yet provide a lubricating effect and minimize wear at the area of brush friction.

2. The electrical machine of claim 1, where the non-oxidizing gaseous medium is selected from the group consisting of carbon dioxide, argon, helium, nitrogen, hydrogen, and mixtures thereof.

3. The electrical machine of claim 1, where the brush comprises metal fibers selected from the group consisting of copper, silver, rhodium, ruthenium, gold, cobalt, aluminum, molybdenum and alloys thereof, having a thickness of between $4\times10^{-4}$ inch and $4\times10^{-2}$ inch and a length of between about 0.08 inch and about 1.0 inch.

4. The electrical machine of claim 1, where the partial pressure of the water vapor in the non-oxidizing gaseous medium is over about 0.09 psi.

5. The electrical machine of claim 1, where the non-oxidizing gaseous medium is selected from the group consisting of carbon dioxide, argon, and mixtures thereof.

6. The electrical machine of claim 1, where the brush fibers are continuously fed to the contacting member to replace brush wear at the point of frictional contact.

7. The electrical machine of claim 1, where the current collector brush is attached to the moving member and is in frictional contact with the stationary member, and the vapor pressure of the water vapor in the gaseous medium is between about 0.09 and about 0.36 psi.

8. The electrical machine of claim 1, where the current collector brush is attached to a stationary member, the moving member is a rotor, and the rotor contacts a copper brush.

9. The electrical machine of claim 8 being a homopolar machine, where the non-oxidizing gaseous medium is carbon dioxide, the vapor pressure of the water vapor in the gaseous medium is between about 0.09 and about 0.36 psi., and the average brush temperature at the contact surface with the rotor slip ring is below about 200° C.

* * * * *